(12) United States Patent
Vazquez Fernandez et al.

(10) Patent No.: US 10,690,209 B2
(45) Date of Patent: Jun. 23, 2020

(54) PRESS-ON COMPOSITE BUMPER TO COMPOSITE PISTON

(71) Applicant: ContiTech Luftfedersysteme GmbH, Hannover (DE)

(72) Inventors: Armando Vazquez Fernandez, San Luis Potosi (MX); Carsten Hansen, Peine (DE); Jose Antonio Martinez Gorbena, San Luis Potosi (MX); Frank Riechers, San Luis Potosi (MX)

(73) Assignee: ContiTech Luftfedersysteme GmbH, Hannover (DE)

( * ) Notice: Subject to any disclaimer, the term of this patent is extended or adjusted under 35 U.S.C. 154(b) by 5 days.

(21) Appl. No.: 16/052,651

(22) Filed: Aug. 2, 2018

(65) Prior Publication Data

US 2020/0040959 A1 Feb. 6, 2020

(51) Int. Cl.
*F16F 9/04* (2006.01)
*F16F 9/05* (2006.01)
(Continued)

(52) U.S. Cl.
CPC .............. *F16F 9/05* (2013.01); *F16F 9/0454* (2013.01); *F16F 9/052* (2013.01); *F16F 9/057* (2013.01); *F16F 9/3214* (2013.01); *B60G 11/27* (2013.01); *B60G 2202/152* (2013.01); *B60G 2206/42* (2013.01); *F16F 2226/044* (2013.01); *F16F 2230/0005* (2013.01); *F16F 2230/0023* (2013.01)

(58) Field of Classification Search
CPC .. F16F 9/05; F16F 9/057; B60G 11/27; B60G 11/28; B60G 11/62

USPC ................ 267/64.21, 64.24, 64.27
See application file for complete search history.

(56) References Cited

U.S. PATENT DOCUMENTS

| | | | |
|---|---|---|---|
| 5,201,500 A * | 4/1993 | Ecktman | B60G 7/04 267/140 |
| 5,535,994 A | 7/1996 | Safreed, Jr. | |

(Continued)

FOREIGN PATENT DOCUMENTS

DE 102013113124 A1 5/2015

OTHER PUBLICATIONS

EP Search Report dated Jan. 7, 2020 of European Application 19189374.2 claiming priority this application.

*Primary Examiner* — Christopher P Schwartz
(74) *Attorney, Agent, or Firm* — David L. Cate; Gregory Adams

(57) ABSTRACT

An air spring includes a composite bumper, a composite piston, a flexible bellow and an upper end cap member. The composite piston has a first end which includes a plurality of rigid portions and a plurality of adjacently positioned cantilever snap joints for receiving and securing the composite bumper. The composite bumper includes an inner wall having a surface shape for securely engaging the plurality of rigid portions and the plurality of cantilever snap joints. The first end of the composite piston further includes a piston housing surface upon which an outer surface of the composite bumper nests against. The flexible bellow is sealingly attached to the composite piston and the upper end cap member. The flexible bellow, the upper end cap member, and the composite piston together form a fluid tight chamber, and the composite bumper is contained within the fluid tight chamber.

18 Claims, 6 Drawing Sheets

(51) Int. Cl.
*F16F 9/32* (2006.01)
*B60G 11/27* (2006.01)

(56) References Cited

U.S. PATENT DOCUMENTS

| | | | |
|---|---|---|---|
| 5,934,652 A | 8/1999 | Hofacre et al. | |
| 5,941,510 A * | 8/1999 | Grass | B60G 7/04 267/64.27 |
| 6,109,598 A * | 8/2000 | Hilburger | B60G 7/04 267/64.24 |
| 6,113,081 A * | 9/2000 | Hilburger | B60G 7/04 267/64.24 |
| 6,234,460 B1 * | 5/2001 | Arnold | B60G 11/28 267/122 |
| 10,060,496 B2 * | 8/2018 | Dehlwes | F16F 9/0454 |
| 2008/0246198 A1 * | 10/2008 | Levy | B60G 11/28 267/124 |
| 2008/0315474 A1 | 12/2008 | Koeske et al. | |

\* cited by examiner

PRESS-ON COMPOSITE BUMPER TO COMPOSITE PISTON

FIELD

The field to which the disclosure generally relates is air springs, and more particularly to vehicle air springs having a composite bumper and composite piston.

BACKGROUND

This section provides background information to facilitate a better understanding of the various aspects of the disclosure. It should be understood that the statements in this section of this document are to be read in this light, and not as admissions of prior art.

Pneumatic springs, commonly referred to as air springs, have been used for vehicles and various machines and other equipment for a number of years to provide cushioning between movable parts, primarily to absorb shock loads imparted thereon. The air spring usually consists of a flexible rubber sleeve which extends between a pair of end members which contains a supply of compressed air and may have one or more pistons located within the flexible sleeve. The end members mount the air spring on spaced components or parts of the vehicle or equipment on which the air spring is mounted.

The internal pressurized fluid which is generally air, absorbs most of the shock impressed upon or experienced by one of the spaced end members by which the air spring is mounted, with the end members moving axially towards and away from each other upon absorbing the imparted shock.

The air springs often have internal bumpers mounted on one of the end members which extends into the interior of the pressurized chamber. The bumper prevents total collapse or deflection of the spring member in the event of air spring failure, or to absorb shock upon the spring experiencing severe shocks and deflections. Such bumpers often consist of an elastomeric member which was mounted on a stud extending outwardly from one of the end members. Although these elastomeric bumpers are satisfactory for most applications, the bumpers require a lubricant and special equipment to assemble the bumpers on the projecting studs. This results in additional cost for both the lubrication and assembly equipment.

Therefore, the need exists for an improved type of air spring bumper which eliminates the heretofore used elastomeric bumper along with the expensive equipment required for mounting the bumper on its internal supporting stud.

SUMMARY

This section provides a general summary of the disclosure, and is not a necessarily a comprehensive disclosure of its full scope or all of its features.

In a first aspect of the disclosure, an air spring includes a composite bumper, a composite piston, a flexible bellow and an upper end cap member. The composite piston has a first end which includes a plurality of rigid portions and a plurality of adjacently positioned cantilever snap joints for receiving and securing the composite bumper. The composite bumper includes an inner wall having a surface shape for securely engaging the plurality of rigid portions and the plurality of cantilever snap joints. The first end of the composite piston further includes a piston housing surface upon which an outer surface of the composite bumper nests against. The flexible bellow is sealingly attached to the composite piston and the upper end cap member. The flexible bellow, the upper end cap member, and the composite piston together form a fluid tight chamber, and the composite bumper is contained within the fluid tight chamber. The air spring may have a 0° bumper load deflection value of less than 0.15 inches at 25,500 lbs, and/or a 0° bumper load deflection value of less than 0.08 inches at 10,000 lbs.

In some cases, the flexible bellow has a first end with a bead, and the upper end cap member has a curled marginal edge which sealing engages the first end of the flexible bellow. The flexible bellow also has a second end which is sealingly connected to the composite piston. The composite piston may have a second end which serves as a base and has a first mounting stud extending outward therefrom, while the upper end cap member may have a second mounting stud and a third mounting stud extending outward therefrom. In some embodiments, the second mounting stud and/or the third mounting stud have a hollow bore in fluid connection with the fluid tight chamber.

In some cases the composite piston includes a bumper mount post which contains the plurality of rigid portions and the plurality of adjacently positioned cantilever snap joints for receiving and securing the composite bumper. In some aspects, the composite piston has two adjacently positioned cantilever snap joints, while in some other aspects there are four adjacently positioned cantilever snap joints.

In another aspect of the disclosure, an air spring includes a composite bumper, a composite piston, a flexible bellow and an upper end cap member. The composite piston has a first end which includes a plurality of rigid portions and a plurality of adjacently positioned cantilever snap joints for receiving and securing the composite bumper. The composite bumper includes an inner wall for securely engaging the plurality of rigid portions and the plurality of cantilever snap joints. The first end of composite piston further includes a plurality of intermittent piston housing surfaces upon which an outer surface of the composite bumper nests against. The flexible bellow is sealingly attached to the composite piston and the upper end cap member. The flexible bellow, the upper end cap member, and the composite piston together form a fluid tight chamber, and the composite bumper is contained within the fluid tight chamber. In some cases, the first end of composite piston includes eight intermittent piston housing surfaces upon which an outer surface of the composite bumper nests against.

In yet another aspect of the disclosure, an air spring includes a composite bumper, a composite piston, a flexible bellow and an upper end cap member. The composite bumper has a first end which includes a plurality of rigid portions and a plurality of adjacently positioned cantilever snap joints for receiving and securing the composite piston, and the composite piston includes a lip for securely engaging the plurality of rigid portions and the plurality of cantilever snap joints. The first end of composite piston further includes a plurality of intermittent piston housing surfaces upon which an outer surface of the composite bumper nests against. The flexible bellow is sealingly attached to the composite piston and the upper end cap member. The flexible bellow, the upper end cap member, and the composite piston together form a fluid tight chamber, and the composite bumper is contained within the fluid tight chamber. In some cases, the first end of composite piston has eight such intermittent piston housing surfaces upon which an outer surface of the composite bumper nests against, and the composite bumper may have four adjacently positioned cantilever snap joints.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
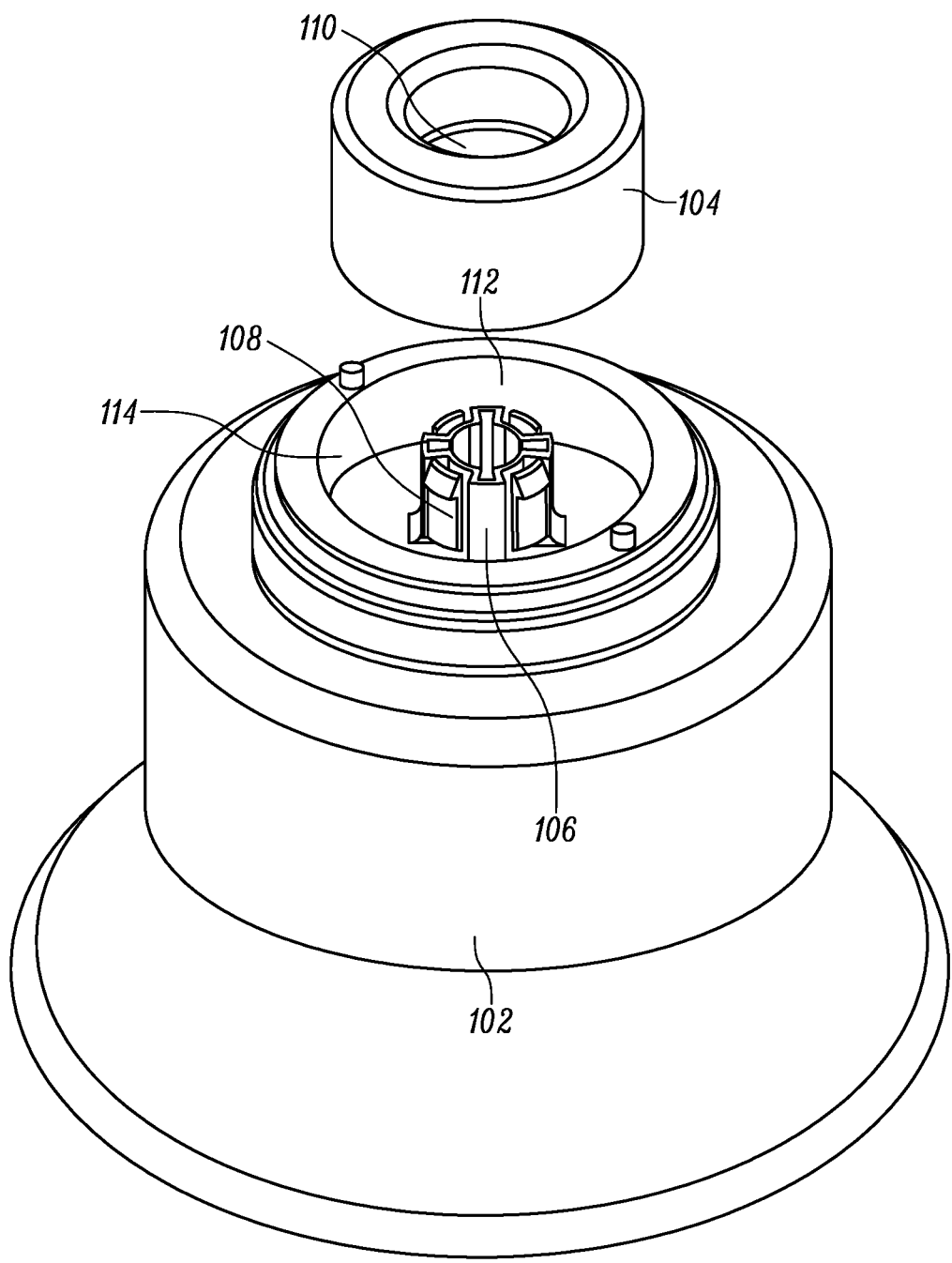
FIGS. 1 and 2 illustrate, in a perspective view, a composite piston and press-on composite bumper arrangement, according to the disclosure.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Embodiments according to the disclosure are air springs which generally include a composite piston, a composite bumper and a flexible bellow. In some aspects, the composite piston includes, on an upper portion, a rigid column and a set snap joints which are of a cantilever type, and also has a cavity that serves as housing for securely nesting a lower portion of the composite bumper. The composite bumper can be assembled to the upper portion of the piston by applying a vertical force to the top of the bumper that produces a briefly deflection of the cantilever snap joints, then the composite bumper fits onto a rigid column and seats on the cavity of the composite piston. Once secured in place, the cantilever snap joints prevent the composite bumper from being pulled out by a vertical force, and the rigid column prevents the bumper from being detached by lateral forces. Also the composite piston cavity, in which the composite bumper seats, provides the necessary bumper nesting that protects the assembly from side load forces.

Some unexpected advantages of embodiments of the disclosure, over the existing state of the art are protection of the joint against very high vertical, lateral, and longitudinal loads; the designs eliminate the need for hardware (i.e. bolts, nuts and washers) for assembling the composite piston with the composite bumper; and the embodiments provide an increase in side load protection to an air spring assembly.

Figure 2:
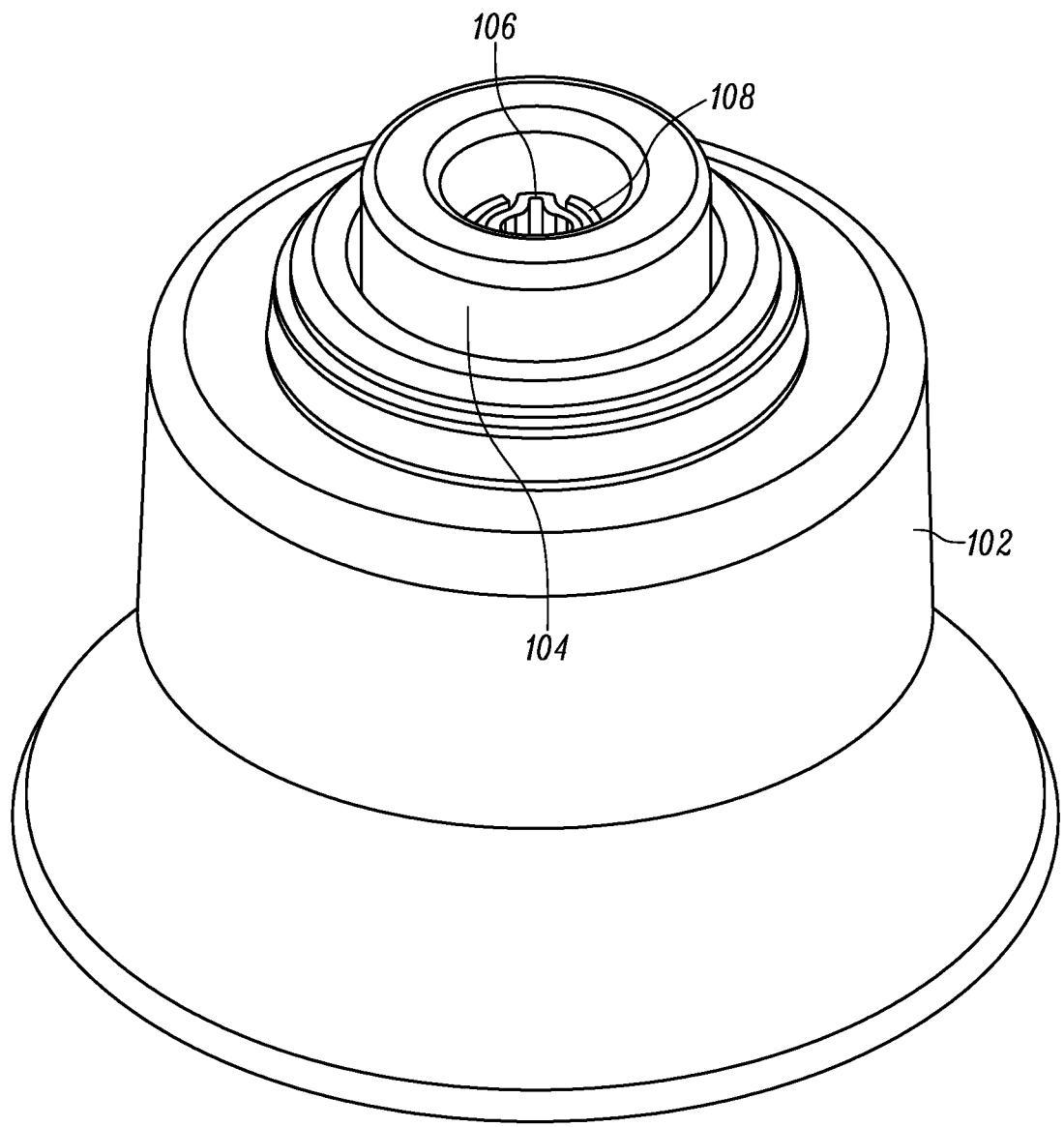

Air springs according to the disclosure include a composite piston and press-on composite bumper, which are indicated generally in FIG. 1. Air springs include a composite piston 102 and press-on composite bumper 104. An end of composite piston 102 includes rigid portions 106 and adjacently positioned cantilever snap joints 108 (four shown) for receiving and securing composite bumper 104. Composite bumper 104 securely engages rigid portions 106 and cantilever snap joints 108 by bumper inner wall 110. The outer surface of composite bumper 104 nests against piston housing surface 112 within piston cavity 114 when securely engaged with rigid portions 106 and cantilever snap joints 108, as depicted in FIG. 2.

Figure 3:
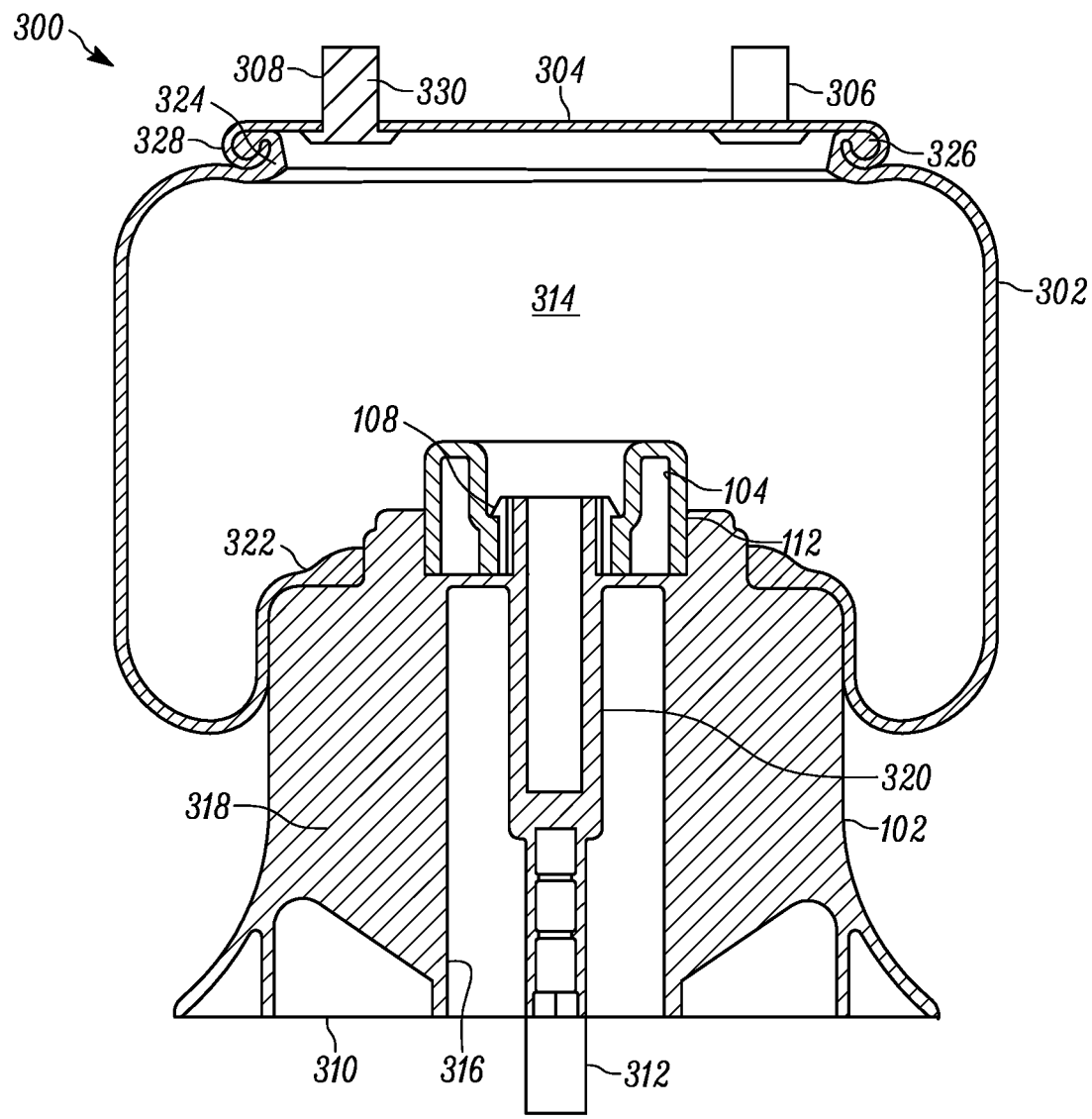
FIG. 3 depicts, in a cross section view, an air spring according to the disclosure.

Now referencing FIG. 3 which depicts air spring 300 in a cross section view. Air spring 300 includes a flexible bellow 302, upper end cap member 304 and opposed axially spaced composite piston 102. Piston 102 is of a usual construction, having an inverted generally hollow shaped configuration formed of a suitable material such as high strength plastic or the like. Flexible bellow 302, piston 102, bumper 104 and upper end cap member 304 together define fluid tight chamber 314. Extending outward from upper end cap member 304 are mounting studs 306 and 308 for mounting air spring 300 on a vehicle, machine tool or other application in which it is to be used.

Piston 102 includes a base 312 and an inner wall 316 extending from the base 310, terminating in an interior section adjacent composite bumper 104, and is part of a central supporting structure 318. Also, extending inwardly from base 310 is bumper mount post 320 which includes cantilever snap joints 108 for securing bumper 104 against piston housing surface 112. Extending outwardly from base 310 is mounting stud 312 for mounting air spring 300 on a vehicle, machine tool or other application in which it is to be used.

One end of the flexible bellow 302, which is indicated generally at 322, terminates and is adhered onto of piston 102 in an air tight sealing relationship with piston 102. The other end 324 of flexible bellow 302 has an end bead 326 which is secured in a curled marginal edge 328 of upper end cap member 304 in an air tight sealing relationship therewith, providing a fluid tight chamber 314 within elastomeric flexible bellow 302. Other types of end sealing arrangements may be utilized without effecting the concept of the invention, such as shown in U.S. Pat. Nos. 4,852,861, 4,787,606 and 4,946,144, which are incorporated herein by reference thereto.

In some embodiments, a source of pressurized air or other fluid, communicates with fluid tight chamber 314 through a hollow bore 330 of mounting stud 308 extending outwardly from end plate 304.

In accordance with the disclosure, the improved press-on bumper indicated generally at 104, as securely mounted on piston 102 and extends upwardly therefrom into fluid tight chamber 314. Bumper 104 engages upper end cap member 304 in the event of a failure of the pressurized fluid within fluid tight chamber 314, or assists in absorbing excessive shock forces exerted on either of the end members.

As described above, the outer surface of composite bumper 104 nests against piston housing surface 112 when securely engaged with rigid portions 106 and cantilever snap joints 108. Such mated and secured contact between composite bumper 104 and piston 102. The composite bumper 104 may be assembled to the upper portion of the composite piston 102 by applying a vertical force to the top of the bumper 104 that produces a brief deflection of the cantilever snap joints 108, then the bumper 104 fits onto a rigid column and seats in the piston cavity 114 which includes piston housing surface 112. Once in place the cantilever snap joints 108 prevent the composite bumper 104 to be pulled out by a vertical force, and the structure of composite piston 102 including rigid portions 106 and piston housing surface 112 prevents the bumper 104 from being detached by lateral forces. Also the piston cavity 114, where the composite bumper 104 securely seats, provides bumper 104 a secure nesting that protects the assembly from side load forces.

With regards to the cantilever snap joints 108 of composite piston 102, any suitable number may be used for securing composite bumper 104. In some cases, two cantilever snap joints are used, while in other embodiments four are used. It is also possible to use six or even eight such cantilever snap joints 108.

Composite piston 102 and composite bumper 104 may be formed of any suitable material, such as, but not limited to, a high strength polyester elastomer or plastic. Some examples of such materials include such as sold under the trademark HYTREL, by Du Pont de Nemours Company of Wilmington, Del. The type of HYTREL found most suitable is Dupont's grade 8238 which has a hardness Durometer D of 82, a tensile strength at break of 6800 psi and an elongation at break of 350%. Composite bumper 104 also may be configured square, cloverleaf etc., and need not be cylindrical as described above and shown in the drawings, without effecting the concept encompassed by the disclosure.

Figure 4:
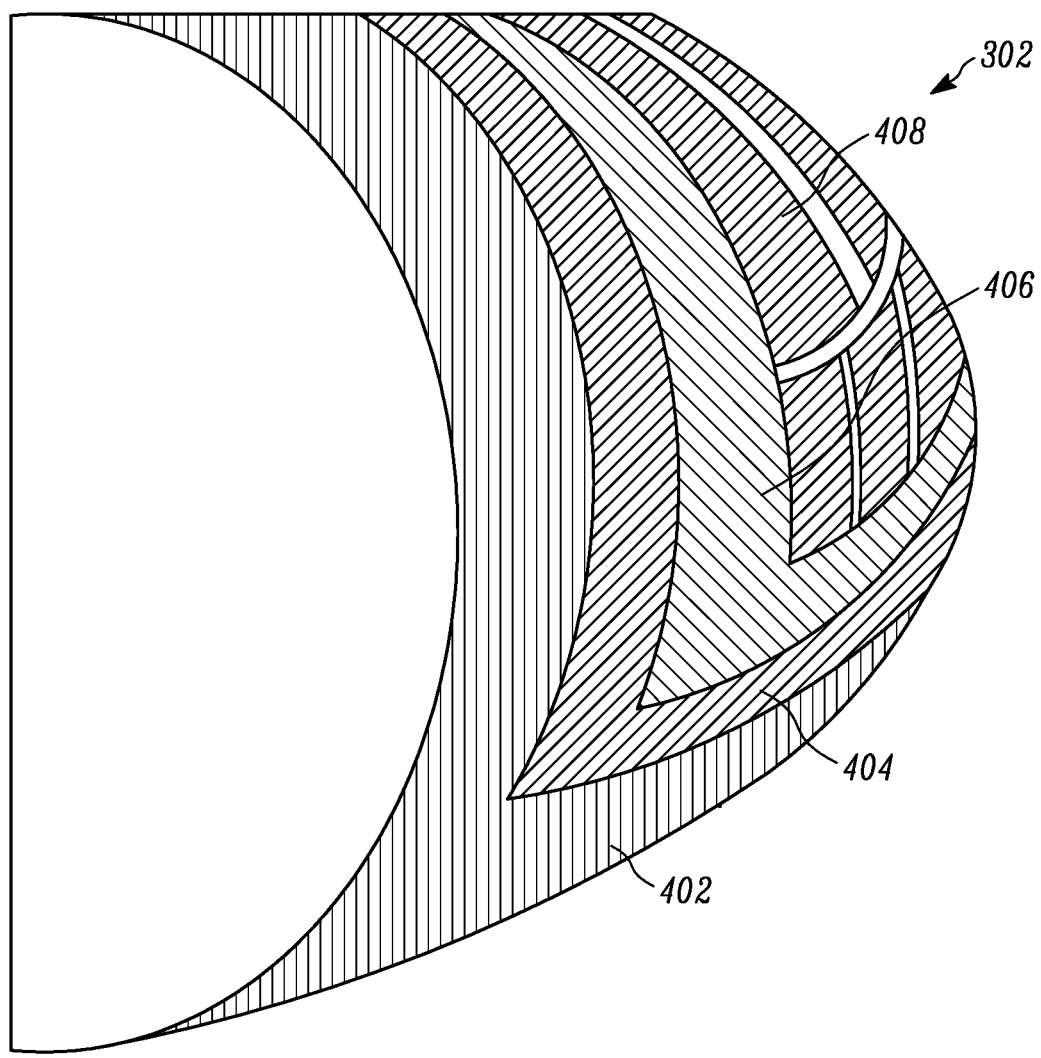
FIG. 4 shows a flexible bellow in a layered break out perspective view according to the disclosure.

Referencing FIG. 4, which shows one non-limiting example of a flexible bellow in a layered break out perspective view, flexible bellow 302 generally incorporates rubber layers and fabric layers that contains a volume of compressed air or other suitable fluid. The flexible bellow 302 itself does not provide force or support load, but the volume of does when the air spring is inflated according to the load required of it. Load capacity may typically vary from 40-40,000 kg. Flexible bellow 302 includes an inner liner 402 of calendered rubber, a first ply 404 of fabric-reinforced rubber, a second ply 406 of fabric reinforced rubber, and an outer cover 408 formed of calendered rubber. First ply 404 and second ply 406 may each have cords which are at a specific bias angle relative to one another.

Figure 5A:
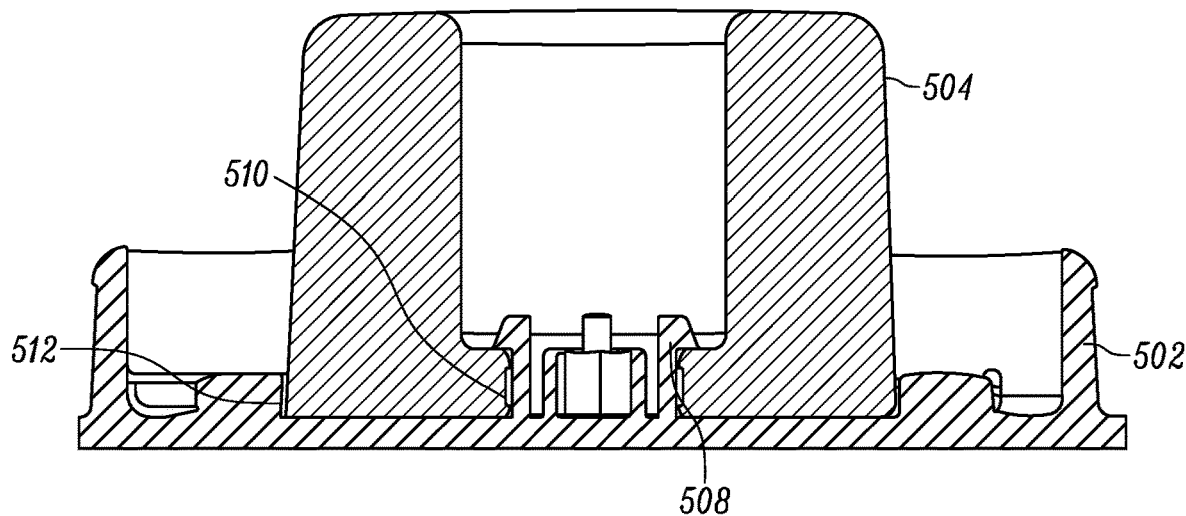
FIGS. 5A and 5B illustrate, in perspective and cross section views, another composite piston and press-on composite bumper arrangement, according to the disclosure; and, FIGS. 6A and 6B depicts, in perspective and cross section views, yet another composite piston and press-on composite bumper arrangement, according to the disclosure.
Figure 5B:
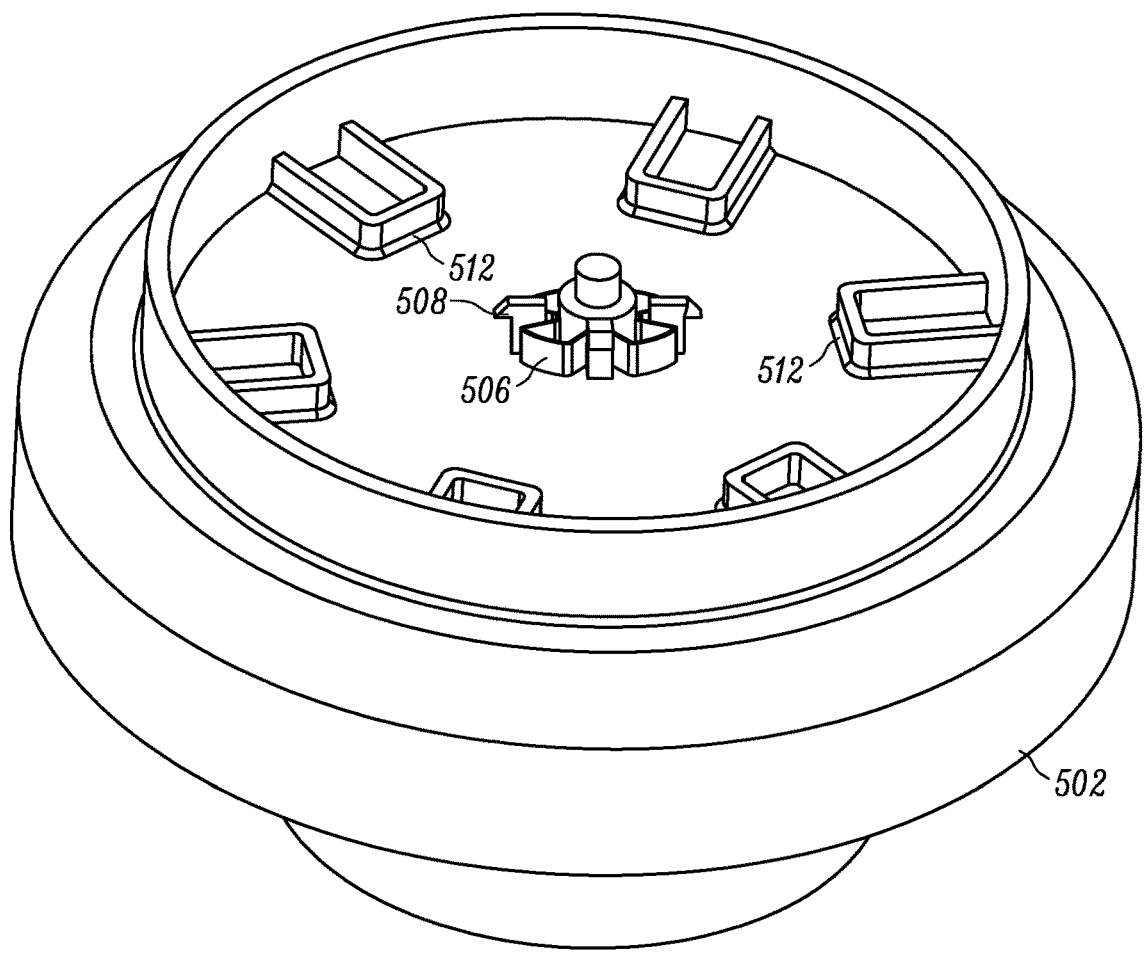

In some other aspects of the disclosure, as illustrated in FIGS. 5A and 5B, composite piston 502 includes an intermittently spaced plurality of piston housing surfaces 512 which nests press-on composite bumper 504 when bumper 504 is pressed onto the piston 502. Air springs according to these aspects include a composite piston 502 and press-on composite bumper 504 where an end of composite piston 502 includes rigid portions 506 and adjacently positioned cantilever snap joints 508 (four shown) for receiving and securing composite bumper 504. Composite bumper 504 securely engages rigid portions 506 and cantilever snap joints 508 by bumper inner wall 510. The outer surface of composite bumper 504 nests against intermittently spaced plurality of piston housing surfaces 512 (eight shown in FIG. 5B) when securely engaged with rigid portions 506 and cantilever snap joints 508.

Figure 6A:
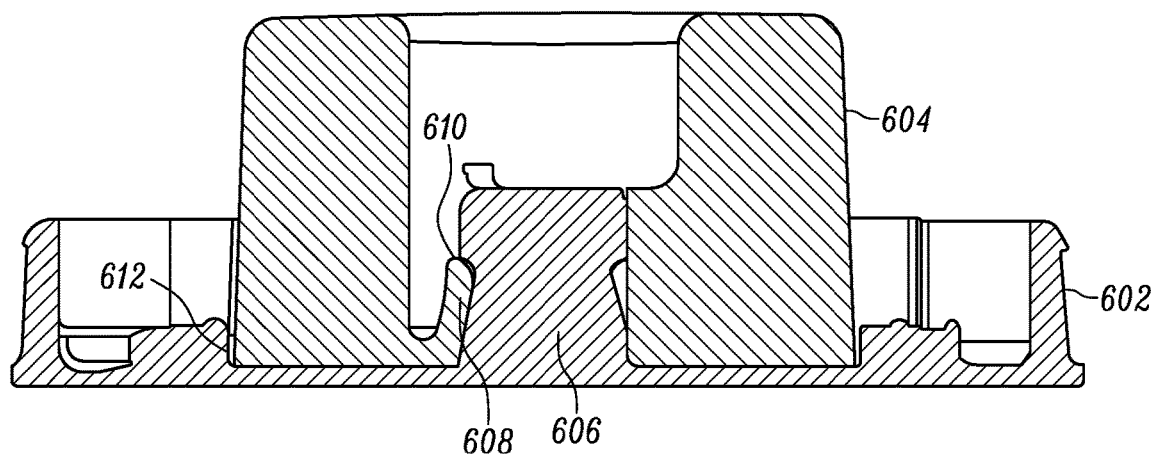
Figure 6B:
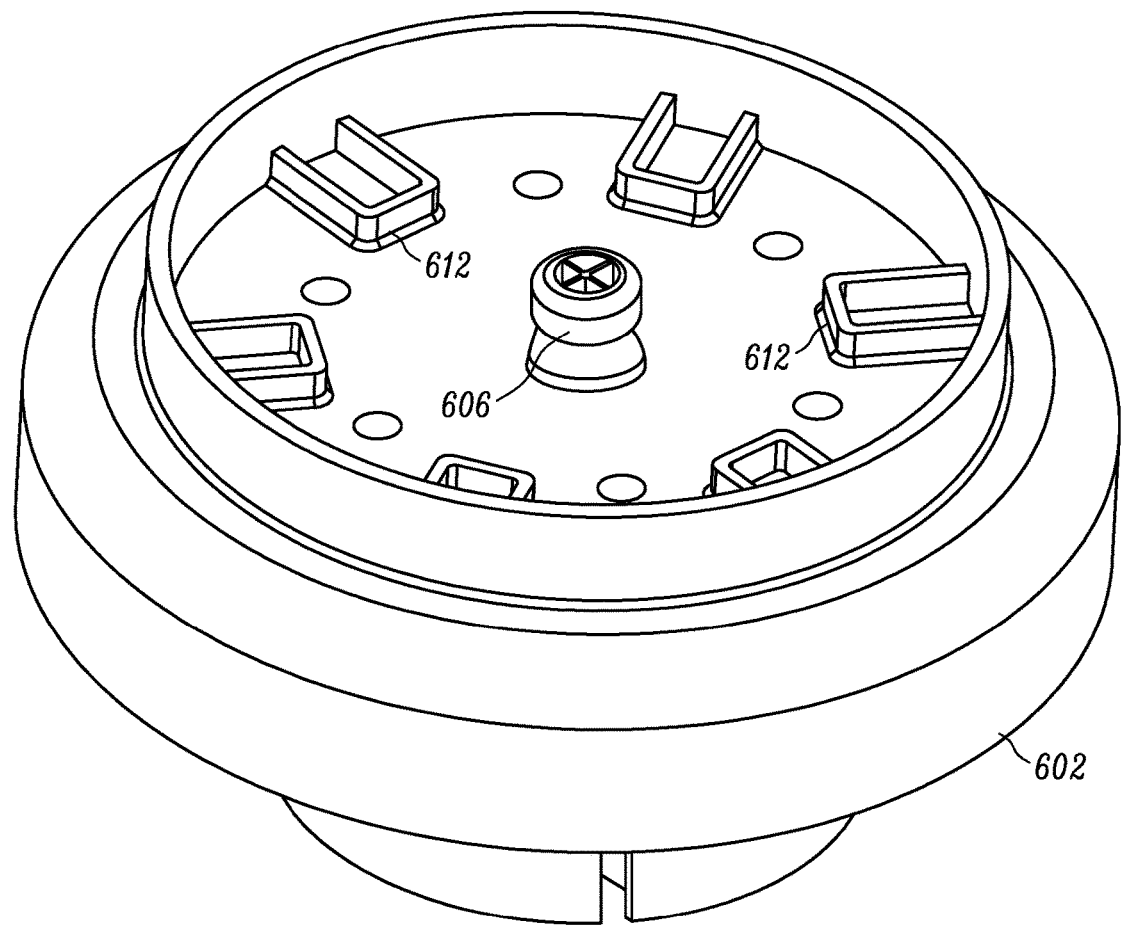

In yet some other embodiments of the disclosure, as illustrated in FIGS. 6A and 6B, composite piston 602 includes an intermittently spaced plurality of piston housing surfaces 612 which nests press-on composite bumper 604. Air springs according to these aspects include a composite piston 602 and press-on composite bumper 604 where the bumper 604 includes cantilever snap joints 608 for receiving and securing with composite piston 602. Composite piston 602 securely engages cantilever snap joints 608 by piston lip 610 formed on post 606. The outer surface of composite bumper 604 nests against intermittently spaced plurality of piston housing surfaces 612 (eight shown in FIG. 5B) when securely engaged with cantilever snap joints 608.

Assembled composite piston and composite bumper embodiments may subjected to load testing to thus meet suitable performance criteria. For example, with reference to FIG. 1, an assembled composite piston 102 and composite bumper 104 may be subjected to a bumper load deflection test at a load angle of 0° relative the central axis of the assembly. The deflection is measured from the original neutral surface of the material to the neutral surface of the deformed material. The configuration assumed by the deformed neutral surface is known as the elastic curve of the material. Embodiments according to the disclosure may have a measured deflection less than 0.5 inches at 25,500 lbs, less than 0.15 inches at 25,500 lbs, less than 0.13 inches at 20,000 lbs, less than 0.10 inches at 15,000 lbs, or even less than 0.08 inches at 10,000 lbs.

Thus, the improved air springs according to the disclosure, and in particular press-on composite bumpers thereof, enables the bumpers to be installed easily onto composite pistons by press-fitting bumpers in a vertical downward direction over an end of composite pistons including rigid portions. The bumpers or pistons have adjacently positioned cantilever snap joints, and inner wall or walls. This provides a bumper and resulting air spring, which is lighter in weight than prior art bumpers formed of an elastomeric material and, most importantly, enables the bumper to be press-fitted into position without requiring lubricant and extra equipment heretofore required for installing the elastomeric bumper. Also, the high strength plastic of the composite bumpers enables it to absorb greater load shocks at equivalent deflections than that absorbed by the prior elastomeric bumpers.

Accordingly, the improved press-on bumpers are simplified, provides an effective, safe, inexpensive, and efficient device which achieves all the enumerated objectives, provides for eliminating difficulties encountered with prior devices, and solves problems and obtains new results in the art.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LISTING OF REFERENCE NUMERALS (PART OF THE SPECIFICATION)

102 Composite piston
104 Press-on composite bumper
106 Rigid portions
108 Cantilever snap joints
110 Bumper inner wall
112 Piston housing surface
114 Piston cavity
300 Air spring
302 Flexible bellow
304 Upper end cap member
306 Mounting stud
308 Mounting stud
310 Base
312 Mounting stud
314 Fluid tight chamber
316 Inner wall
318 Central supporting structure
320 Bumper mount post
322 End of flexible bellow
324 End of flexible bellow
326 End bead
328 Curled marginal edge
330 Hollow bore of mounting stud
402 Inner liner
404 First ply of fabric-reinforced rubber
406 Second ply of fabric reinforced rubber
408 Outer cover
502 Composite piston
504 Composite bumper
506 Rigid portions
508 Cantilever snap joints
510 Bumper inner wall
512 Piston housing surfaces
602 Composite piston
604 Composite bumper
606 Post
608 Cantilever snap joints
610 Piston lip
612 Piston housing surfaces

What is claimed is:

1. An air spring comprising a composite bumper, a composite piston, a flexible bellow and an upper end cap member, wherein the composite piston has a first end which includes a plurality of rigid portions and a plurality of adjacently positioned cantilever snap joints for receiving and securing the composite bumper, and wherein the composite bumper includes an inner wall for securely engaging the plurality of rigid portions and the plurality of cantilever snap joints;
    wherein the first end of composite piston further comprises a piston housing surface upon which an outer surface of the composite bumper nests against;
    wherein the flexible bellow is sealingly attached to the composite piston and the upper end cap member;
    wherein the flexible bellow, the upper end cap member, and the composite piston together form a fluid tight chamber; and,
    wherein the composite bumper is contained within the fluid tight chamber.

2. The air spring according to claim 1, wherein the flexible bellow comprises a first end with a bead, wherein the upper end cap member comprises a curled marginal edge which sealing engages the first end of the flexible bellow, and wherein the flexible bellow comprises a second end which is sealingly connected to the composite piston.

3. The air spring according to claim 1, wherein the composite piston comprises a second end which serves as a base and has a first mounting stud extending outward therefrom, wherein the upper end cap member comprises a second mounting stud and a third mounting stud extending outward therefrom.

4. The air spring according to claim 3, wherein the second mounting stud and/or the third mounting stud have a hollow bore in fluid connection with the fluid tight chamber.

5. The air spring according to claim 1, wherein the composite piston comprises a bumper mount post which comprises the plurality of rigid portions and the plurality of adjacently positioned cantilever snap joints for receiving and securing the composite bumper.

6. The air spring according to claim 1, wherein the composite piston comprises two adjacently positioned cantilever snap joints.

7. The air spring according to claim 1, wherein the composite piston comprises four adjacently positioned cantilever snap joints.

8. The air spring according to claim 1 having a 0° bumper load deflection value of less than 0.15 inches at 25,500 lbs.

9. The air spring according to claim 1 having a 0° bumper load deflection value of less than 0.08 inches at 10,000 lbs.

10. An air spring comprising a composite bumper, a composite piston, a flexible bellow and an upper end cap member, wherein the composite piston has a first end which includes a plurality of rigid portions and a plurality of adjacently positioned cantilever snap joints for receiving and securing the composite bumper, and wherein the composite bumper includes an inner wall for securely engaging the plurality of rigid portions and the plurality of cantilever snap joints;

wherein the first end of composite piston further comprises a plurality of intermittent piston housing surfaces upon which an outer surface of the composite bumper nests against;

wherein the flexible bellow is sealingly attached to the composite piston and the upper end cap member;

wherein the flexible bellow, the upper end cap member, and the composite piston together form a fluid tight chamber; and, wherein the composite bumper is contained within the fluid tight chamber.

11. The air spring according to claim 10, wherein the flexible bellow comprises a first end with a bead, wherein the upper end cap member comprises a curled marginal edge which sealing engages the first end of the flexible bellow, and wherein the flexible bellow comprises a second end which is sealingly connected to the composite piston.

12. The air spring according to claim 10, wherein the composite piston comprises a second end which serves as a base and has a first mounting stud extending outward therefrom, wherein the upper end cap member comprises a second mounting stud and a third mounting stud extending outward therefrom.

13. The air spring according to claim 12, wherein the second mounting stud and/or the third mounting stud have a hollow bore in fluid connection with the fluid tight chamber.

14. The air spring according to claim 10, wherein the composite piston comprises a bumper mount post which comprises the plurality of rigid portions and the plurality of adjacently positioned cantilever snap joints for receiving and securing the composite bumper.

15. The air spring according to claim 10, wherein the first end of composite piston further comprises eight intermittent piston housing surfaces upon which an outer surface of the composite bumper nests against.

16. The air spring according to claim 10, wherein the composite piston comprises four adjacently positioned cantilever snap joints.

17. The air spring according to claim 10 having a 0° bumper load deflection value of less than 0.15 inches at 25,500 lbs.

18. The air spring according to claim 10 having a 0° bumper load deflection value of less than 0.08 inches at 10,000 lbs.

* * * * *